Patented Aug. 3, 1937

2,088,792

UNITED STATES PATENT OFFICE 2,088,792

SEXUAL HORMONE COMPOUNDS AND PROCESS OF PRODUCING SAME

Fritz Johannessohn, Mannheim-Freudenheim, and Erich Rabald, Mannheim, Germany, assignors to C. F. Boehringer & Soehne G. m. b. H., Mannheim-Waldhof, Germany No Drawing. Application August 31, 1934, Serial No. 742,274. In Germany September 6, 1933

9 Claims. (Cl. 260—131)

Our invention relates to new compounds of the sexual hormones, which are more efficient than the hormones themselves, and to the method of producing same. It relates more particularly to the hitherto unknown glucosides of the sexual hormones, which have been found to be from 3 to 4 times more efficient in producing oestrus in animals than the free hormones themselves, the effect obtained with these glucosides also lasting longer than the effect obtained with the hormones proper.

The term "glucosides" is understood to comprise all ether-like compounds of the glucosidic hydroxyl group of simple and composite carbohydrates of the sugar type with compounds of alcoholic character.

Such glucosides can be produced from all hormones containing at least one hydroxyl group of alcohol character, this being for instance the case in the follicle hormone and its isomers, the dihydro follicle hormone, the equiline, the hippuline, the equilinine and the male sexual hormone. From these and similar hormones the glucosides can be produced by any of the known methods used in the production of glucosides. It makes no difference whether said hydroxyl group is bound to an aliphatic or to an alicyclic or to an aromatic carbon atom. The hydrogen of the hydroxyl group may be replaced by a metal, for instance an alkali metal.

In practising our invention we may for instance proceed as follows:

Example 1

A mixture of .1140 gram follicle hormone, .1604 gram pentaacetylglucose and .0535 gram anhydrous zinc chloride is heated 30 minutes to 130° C. in the glycerine bath. During the heating acetic acid escapes. The product of reaction is dissolved in chloroform and washed with water, until the water does not show any chloride reaction. The chloroform solution is now evaporated to dryness, the residue is pulverized and shaken during 24 hours with 10 ccms. baryta water containing .5 gram Ba(OH)₂. After filtration the residue is dissolved in chloroform, the solution is evaporated and the residue shaken with anhydrous ether. After filtration the residue is once more dissolved in chloroform and the crude glucoside obtained after evaporation of the solvent is recrystallized from absolute alcohol. The pure glucoside, which is insoluble in ether, melts at 223° C. Its physiological effect in producing oestrus in mice is 3 to 4 times as high as the effect obtained with the hormone itself. Besides this the effect obtained with the glucoside will last longer than that obtained with the hormone itself.

Example 2

.1215 gram follicle hormone is dissolved in the equivalent quantity of 1/10 normal alcoholic caustic potash solution and the solution thus obtained is evaporated to dryness in vacuo. The product of reaction is shaken during 24 hours with 3 ccms. of an etheric solution containing .0823 gram acetochloroglucose. The solution is now acidified with glacial acetic acid and evaporated to dryness. The residue is exhaustively extracted with chloroform and the extract is evaporated. The residue is treated further with baryta solution etc. as described with reference to Example 1.

Instead of first causing reaction between the acetochloroglucose and the salt formed from the follicle hormone and the alkali we may also react directly the hormone, caustic potash solution containing some alcohol and the acetochloroglucose, whereupon the potassium chloride, which has precipitated, is separated by filtration and the filtrate evaporated and treated with baryta water as described with reference to Example 1.

Example 3

.137 gram follicle hormone is mixed with .200 gram pentaacetylgalactose and .050 gram anhydrous zinc chloride. This mixture is heated during 20 minutes to 120° C. in the glycerine bath, the product of reaction is taken up with chloroform and washed first with water, thereafter with dilute caustic soda solution and thereafter once more with water. The solution is then evaporated to dryness, the residue is pulverized and shaken during 3 hours with 25 ccms. baryta water. After filtration the residue is dried and extracted with chloroform, the chloroform solution is evaporated, extracted with anhydrous ether and the residue once more taken up with chloroform. After evaporation of the solvent one obtains the galactoside of the follicle hormone in the form of a yellowish powder.

Instead of zinc chloride as mentioned above other substances known as furthering etherification (cf. for instance "Methoden der organischen Chemie" by Houben, third edition, 1930, vol. 3, page 134) may be used as etherification catalysts.

Various changes may be made in the details disclosed in the foregoing specification without departing from the invention or sacrificing the advantages thereof.

We claim:—

1. The process of producing a glucoside of the follicle hormone comprising heating the hormone with pentaacetylglucose in the presence of an etherification catalyst, treating the product with chloroform and recrystallizing the glucoside thus obtained.

2. The method of producing the galactoside of the follicle hormone comprising heating the hormone with pentaacetylgalactose in the presence of an etherification catalyst, treating the product with chloroform and removing the chloroform from the galactoside thus obtained.

3. The glucosides of sexual hormones, being solids, slightly colored, soluble in chloroform, inoluble in ether, water and baryta water and having an at least 3 times higher and more lasting physiological effect than the corresponding hormones proper.

4. The glucoside of the follicle hormone, being a crystalline solid slightly colored, soluble in chloroform and in absolute alcohol, insoluble in ether, water and baryta water, melting at about 223° C. and having an at least 3 times higher and more lasting physiological effect than the follicle hormone itself.

5. The galactoside of the follicle hormone, having the form of a yellowish powder, being soluble in chloroform, insoluble in ether, water and baryta water, and producing an at least 3 times higher and more lasting physiological effect than the follicle hormone itself.

6. The method of producing a glucoside of the follicle hormone comprising acting in etheric solution with acetochloroglucose on a follicle hormone, the hydrogen of an alcoholic hydroxyl group of which hormone has been replaced by an alkali metal, eliminating the product formed by the reaction, treating said product with chloroform and recrystallizing the glucoside thus obtained.

7. The method of producing a glucoside of the follicle hormone comprising acting on the follicle hormone in a solution of caustic potash with acetochloroglucose, separating the potassium chloride from the raw glucoside formed in the reaction, treating said glucoside with chloroform and recrystallizing said glucoside.

8. The process of producing sexual hormone compounds comprising acting with a sexual hormone containing a group of the type-OX, wherein X is a member of the group consisting of hydrogen and alkali metals, on an esterified carbohydrate of the sugar type.

9. The process of producing sexual hormone compounds comprising acting with a sexual hormone containing a group of the type-OX, wherein X is an element of the group consisting of hydrogen and the alkali metals, on a carbohydrate of the sugar type, the glucosidic hydroxyl group of which is esterified.

FRITZ JOHANNESSOHN.
ERICH RABALD.